Nov. 26, 1957

H. A. TOULMIN, JR 2,814,162

APPARATUS FOR PRODUCTION OF METALLIZED
AND BONDED BLOWN GLASS FIBERS

Filed June 25, 1954

INVENTOR.
HARRY A. TOULMIN JR.
BY Toulmin & Toulmin
ATTORNEYS

2,814,162
Patented Nov. 26, 1957

2,814,162

APPARATUS FOR PRODUCTION OF METALLIZED AND BONDED BLOWN GLASS FIBERS

Harry A. Toulmin, Jr., Dayton, Ohio, assignor to The Commonwealth Engineering Company of Ohio, Dayton, Ohio, a corporation of Ohio Application June 25, 1954, Serial No. 439,333

2 Claims. (Cl. 49—1)

This invention relates to metallized and bonded glass fibers and particularly to the metallizing and/or bonding of blown fiber glass in the form of mats. Still more particularly the invention relates to apparatus and processes for the production of metallized and/or bonded blown glass fiber products having extremely useful properties where lightness in weight, high strength, electrical conductivity or any of these are factors.

The invention particularly contemplates the provision of means to produce mats of blown glass fibers and in combination therewith means to metallize the fiber mats as they are produced.

Blown glass fibers are normally collected as they are produced from filamentary glass on a screen and the single mat layers are usually wound up as they are continuously removed from the screen in order to produce a bat of fibers which may be handled. The attainment of the above noted object of this invention results in a metallized single layer of fibers which may be readily manipulated, is of extreme flexibility, substantially equal to that of the mat, and is electrically conductive.

In practice the mat of fibers to which the metal is applied may have a thickness of less than that of a translucent tissue paper and in fact the mat of glass fibers itself may be translucent; the metal film which is highly adherent to the fiber when deposited in the manner described hereinafter may have a thickness approaching the monomolecular.

The invention further particularly contemplates the provision of thin rigidized products comprising glass fibers in thin mat form, metal and plastic materials. The metal may be substantially any of those which may be deposited thermally from the gaseous state, it being only necessary that the glass fibers have a softening point suitably above the thermal decomposition point of the metal bearing compound selected, and the glass itself may usually be chosen to achieve this purpose; in fact most glasses which are formable into fine blown fibers will withstand the temperature at which most of the metal bearing compounds decompose.

The plastic may be present upon the metal which coats the fibers or it may be adhered to the fibers directly on one side of the surface of the mat while metal coats the other side of the fibers; or alternatively the metallized mat itself may be completely coated with the plastic. While thermosetting resins are employed in order to obtain rigidized products, plastics are generally within the contemplation of the invention.

The invention also contemplates as a primary objective the provision of materials which may be given particular properties desired by suitable selection, arrangement and treatment of the components hereinafter described. Chief among the characteristics of all of the products set forth hereinafter are lightness in weight and strength; metallized fibrous glass of such lightness that it is readily supported by ordinary air currents and blown in the air for long periods is readily attainable.

Heavier but still relatively light products comprising the metallized fibrous mats coated with plastic may be of such rigidity as to resist high velocity objects; the rigidity attainable is such that the materials described are useful as building components and that very novel feature of the structural materials is the novel appearance created by the employment on the fibers of the combination of the metal and transparent plastic materials.

The invention in addition contemplates the formation of extremely light weight products in the form of electrical components which due to their low gravity are utilizable in airplanes, ships and powered vehicles of all kinds.

Referring now more particularly to the invention filaments of glass are subjected to a high velocity, high temperature gas blast and are softened and attenuated thereby, the blast velocity being effective to drive the fibers resulting from the attenuation onto a receiving surface.

The fibers thus collected, when the receiving surface is moved relatively rapidly and transversely to the blast carrying the fibers, are in extremely thin mat form, resembling somewhat a tissue paper, and when a screen belt is employed as the receiving surface, the impressions of the screen are clearly noticeable on the mat. The collected fibers are strong, in view of their thinness, but are nevertheless difficult to handle, and in the practice of the preferred embodiment of this invention the fibers, while retained on the screen, are heated to the thermal decomposition point of a metal bearing gaseous compound and passed directly to an atmosphere of such compound to have metal deposited thereon.

The screen which preferably is of metal, although it may be of other materials, assists in the retention of heat and maintains the fibers at a sufficient temperature, such that the thermally decomposable gas is readily broken down to effect the metallic film on the fibers.

In a suitable arrangement of the equipment described more particularly hereinafter, both surfaces of the fiber mat may be metallized if desired.

Most suitably the speed of the moving receiving surface is controlled to attain the desired thickness of both the fiber mat and the metal coat thereon. Where relatively thick fibrous mats are desired, the speed of the receiving means may be low and a thin metal deposit may be achieved by simply controlling the quantity of metal bearing gas to which the mat on the receiving belt is exposed.

The application of the thermo-setting or thermo-plastic materials to the metallized fibers is effected by dipping, spraying, roll coating, or painting, and where required the plastic coated metallized fibers may be subjected to heat in any suitable manner to effect the setting of the resins in the usual manner.

It is to be particularly noted that the plastic is not required in order to bond the metal securely to the fiber glass surface and that products of invention are useful with or without resinous materials, the resin being employed to attain rigidity and translucency where such factors are desirable.

A further feature of the metallized or metallized and resin coated products is the freedom of the composite from moisture as such has not opportunity to adhere to the fibers due to the method of metallizing immediately upon mat formation.

The invention will be more fully understood by reference to the following detailed description and accompanying drawings wherein:

Figure 3 is a view taken on line 3—3 of Figure 1;

Figure 4 is a view taken on line 4—4 of Figure 1;

Figure 5 is a plan view of a portion of the apparatus of Figure 1;

Figure 8:
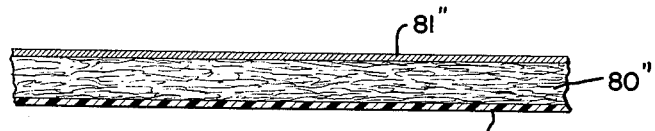
Figures 10, 11:
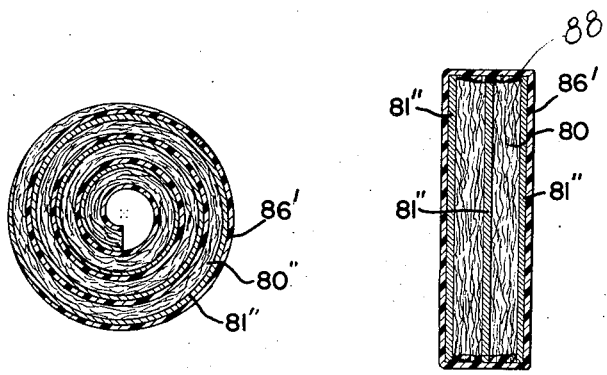

Figures 6 to 9, inclusive, are sectional views illustrating products of the invention;

Figure 10 illustrates the structure of Figure 8 in rolled form; and

Figure 6:
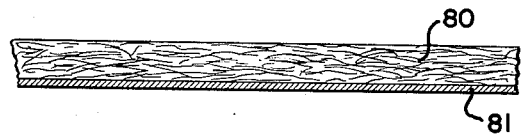
Figure 7:
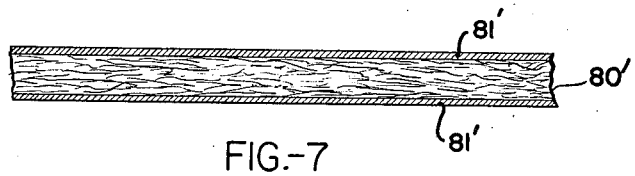

Figure 11 illustrates a combination of the structures of Figures 6 and 7 which has been resin coated.

Referring to the drawings and the preferred embodiment of the invention, there is indicated at 1 a body of molten glass and at 2 a bushing provided with a plurality of feeding orifices in its bottom wall and through which the molten glass is exuded in small streams which are attenuated into filaments 3 by means of co-acting feed rolls 7, 9. The numeral 5 indicates a guide roll over which the filaments are drawn in parallel relation to be presented to a guide 11, the lower end of which is exposed to a high velocity, high temperature gas blast 13 issuing from burner 15. The velocity of this blast may be between about 1600 to 1800 feet per second and the temperature across the blast where the filaments meet the end of the guide is preferably about 3100 to 3300 degrees Fahrenheit.

The contact of the hot blast with the filaments melts the same and causes them to be highly attenuated and blown through conduit 17 in the form of fine fibers to be collected on belt 19 positioned at the end of the conduit. The belt 19 is mounted on sprockets 21, 23, 25 the latter of which is driven through suitable gearing and motor combination indicated at 27. The belt itself as shown in Figure 3 is constituted of a fine mesh screen 29 and is laterally provided with supports 31 on which there is mounted at 33 compressible rubber stripping extending completely longitudinally around the belt on both sides thereof. The material 33 may be natural rubber, neoprene and/or a silicone and is provided to effect sealing engagement with apparatus hereinafter described.

Figure 1:
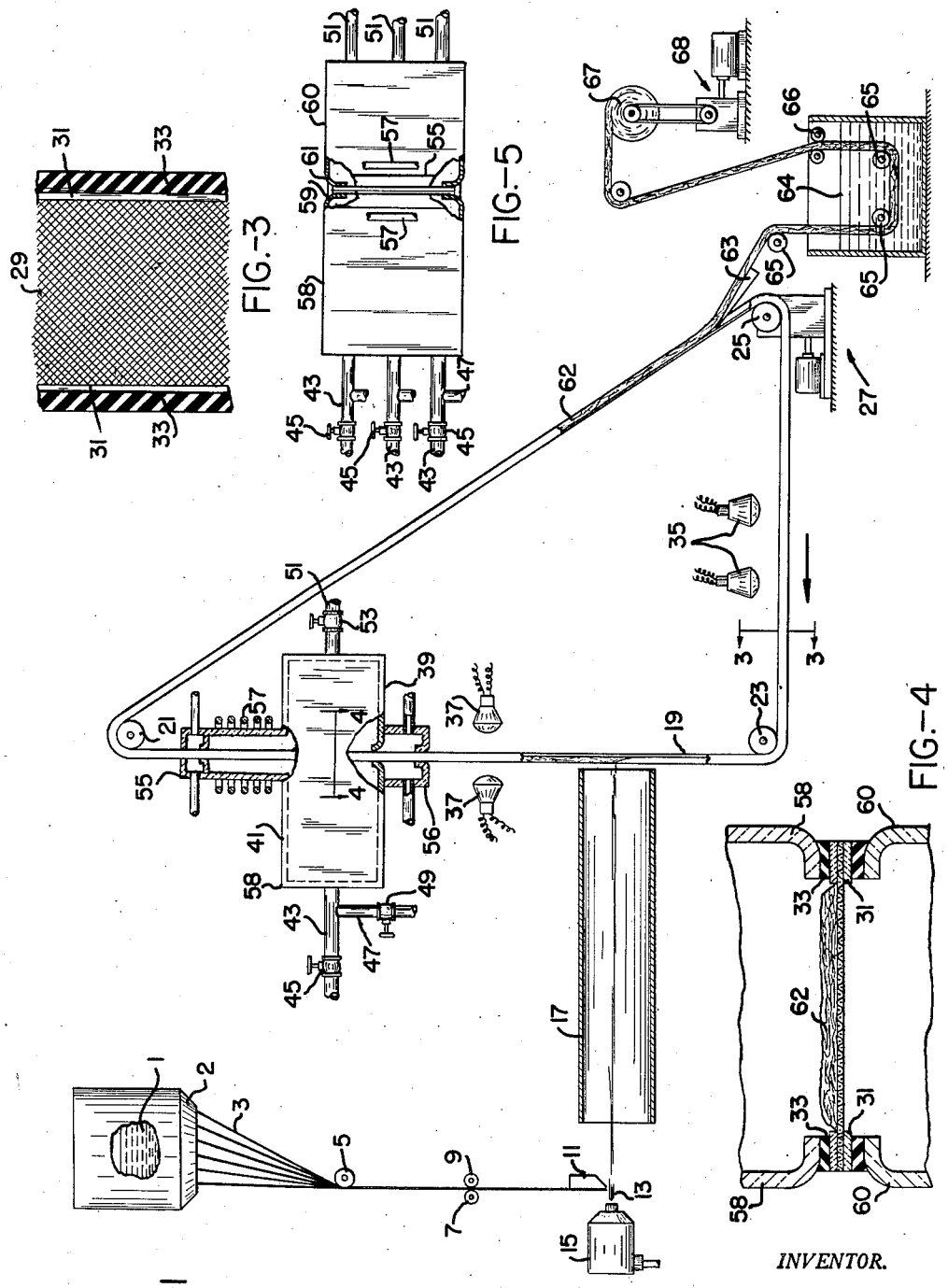
Figure 1 is a schematic elevational view of equipment useful in the practice of the invention.

As shown in Figure 1 infra-red lights 35 are provided on the lower run of the belt to heat the same as it passes in the direction of the arrow towards the conduit 17. Also positioned above the conduit are infra-red lights 37 which heat both the screen and the glass fibers deposited thereon prior to entry of the fibrous mat into chamber 39 of the metallizing portion of the apparatus.

Chamber 39 is preferably comprised of a substantially rectangular glass box having walls 41, the opposed longitudinal ends of which are provided with ports for the inlet and outlet of gases. Thus conduits 43 are each provided with inlet valves 45 for the passage into the chamber of a metal bearing gas from a source (not shown). Connecting with the conduits 43 are conduits 47 having valves 49 for the passage of a carrying gas, such as carbon dioxide, nitrogen, hydrogen, or argon, for example, into the chamber mixed with the metal bearing gas.

The outlet conduits 51 have valves 53 and are preferably equal in number to the inlet conduits, but not necessarily so, and the outlet conduits are connected to vacuum, and a trap (not shown) may suitably be interposed into the vacuum line for the passage of any undecomposed metal bearing gases passing through the chamber.

The metal bearing gas may be any which decomposes at a temperature below that at which the glass fibers begin to soften and preferably is nickel carbonyl.

The following table indicates a number of suitable gases and the conditions under which they are preferably employed, which conditions are understood to be merely illustrative and not limiting:

| Plating Material | System Pressure, mm. of Hg | Temperature Range of Base Material in Degrees Fahrenheit |
| --- | --- | --- |
| $Ni(CO)_4$ | 0.5–1.0 | 350–750 |
| $Cr(CO)_6$ | 0.5–1.8 | 375–450 |
| $Mo(CO)_6$ | 0.5–1.8 | 450–650 |
| $W(CO)_6$ | 0.5–1.8 | 525–775 |
| $Cu(C_5H_7O_2)_2$ | 0.5–1.8 | 400–750 |

The screen belt 19 as it passes upwardly through the plating chamber 39 suitably enters an upwardly extending portion 55 of the chamber, walls of which are integral with the remainder of the chamber.

The portion 55 is surrounded by an induction coil indicated at 57 and a long heated traverse of the belt within the chamber is thus provided without materially increasing the weight of the chamber.

Further, while the glass fibers would not normally be heated themselves inductively metal has deposited on the belt prior to the time it enters the portion 55, and this metal is inductively heated permitting more metal to be deposited; the metal belt 19 which is preferably of steel is also heated by induction and transfers this heat to the fibers.

Since most metal bearing gases may not be allowed to escape into the room safely, it is essential that the belt 19 seal well against the chamber and for this purpose, as shown in Figures 4 and 5, portion 58 of chamber 39 has inturned ends 59 and portion 60 has inturned ends 61, and these inturned portions upwardly extend (Figure 5) and may pass across the chamber at the top and bottom thereof.

Suitable gas seals are provided across the belt inlet and outlet as shown in Figure 1 the box 56 being airtight and having an inlet for carbon dioxide at a pressure slightly above atmospheric, the gas continuously flowing out through the opposite conduit, the $CO_2$ pressure being sufficient to prevent air ingress to the plating chamber. A similar seal constituted by chamber 55 having an inlet and outlet also is provided at the belt exit.

The belt 19 on the upper run thereof passes over the sprocket 21 with the metallized glass fibers indicated at 62 thereon and in the downward run of the belt the fibers are lifted slightly by a knife-like arrangement shown at 63 and the metallized fibers are separated from the belt, which continues its traverse in an endless fashion over the sprockets.

The metallized fiber passes continuously to a bath of resin indicated at 64; pulleys 65 are provided to support the same in its traverse, and squeeze rolls 66 cooperate at the exit of the bath to remove excess material from the metallized fiber. The same is then wound at 67 on the reel which is suitably driven by means generally indicated at 68 comprising a gear box and motor.

If desired a heating oven 69 may be interposed between the resin bath and the wind-up reel in order to partially set the resin, which is preferably of the thermosetting type, such as a polymerizable liquid composition comprising a blend of 100 parts of an alkyd resin comprising glycol, maleic acid and phthalic acid, about 30 parts of a vinyl-substituted heterocyclic tertiary amine, and about ½ percent by weight of benzoyl peroxide as a catalyst, as described in co-pending application of Hiler and Peake, Serial No. 38,155, filed February 20, 1953, and assigned to the same assignee as the present invention.

This resin produces a transparent coat through which the metal is clearly visible and is very attractive to the eye. When laminated together into three to four layers the product is quite rigid and useful as a structural member.

Figure 2:
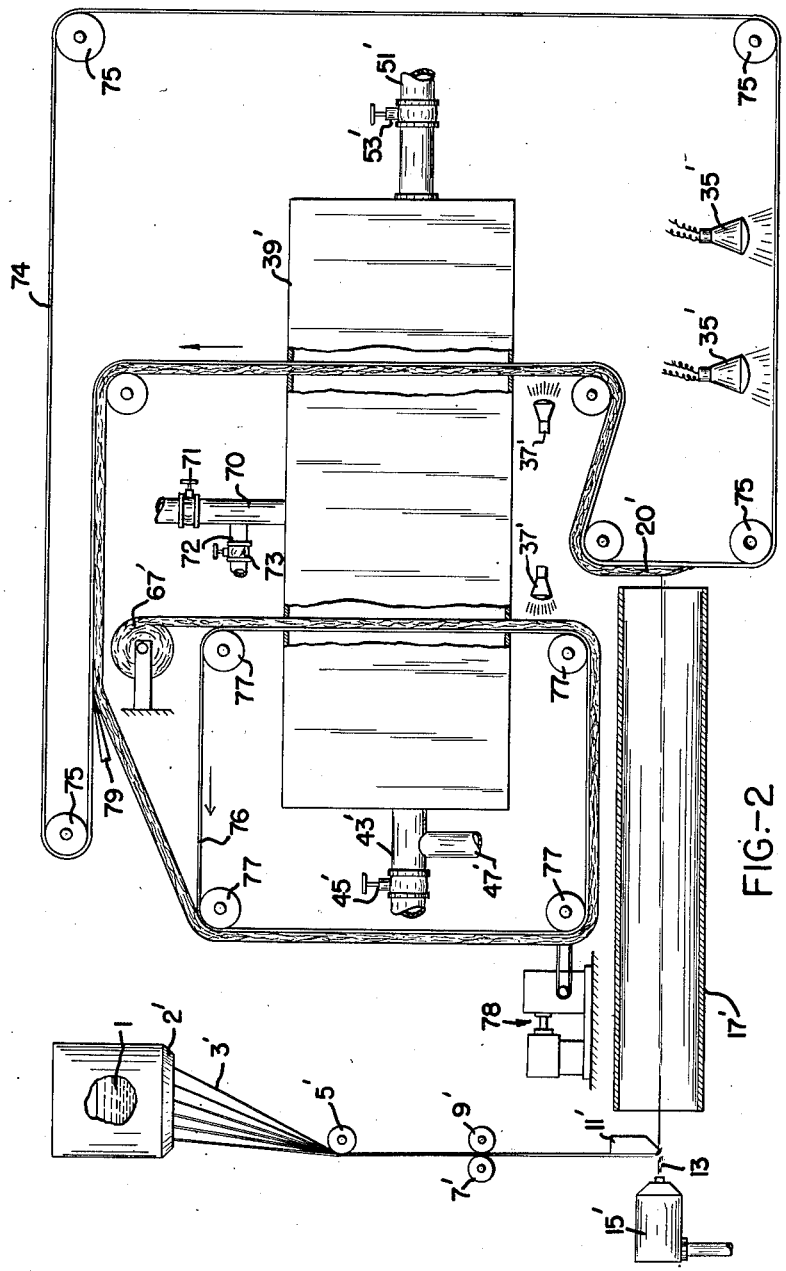
Figure 2 is a perspective view of a further embodiment of apparatus useful in the invention.

Referring now to Figure 2, there is set forth another embodiment of the apparatus for effecting plating on both sides of a mat as it passes through the chamber 39'. In Figure 2 numerals similar to those employed in Figure 1 are utilized primed to indicate parts corresponding to those in Figure 1.

Thus inlet conduits 43' and outlet conduits 51' function in exactly the same manner as described on connection with Figure 1 when it is desired to plate only one side of a mat. However, an additional conduit 70 having a valve 71 for the flow of a suitable source of gaseous heat decomposable metal bearing compound is provided and a conduit 72 having a valve 73 communicates with the conduit 70 for the flow of a carrier gas into the chamber. When utilizing this inlet both sides of a mat may be plated and valve 45' may be closed off.

In this instance two belts are employed in order that the mat may be coated with metal on both sides without removal from the apparatus. The first belt 74 is long and passes endlessly over the sprockets 75 and itself receives the mat of blown fibers 20' from the conduit 17' and the upper face is coated with metal in its passage through the chamber 39' as already described in connection with Figure 1, the metal bearing gas being fed through conduit 70 and the exhaust gases passing around and through the screen to the outlet 51'.

Belt 74 after passing through the chamber has a reverse leg which extends over the upper run of belt 76 which is itself driven on sprockets 77 in any suitable manner as through a motor and gear box indicated generally at 78.

The metallized mat tends to fall away from the belt 74 in the upper run thereof and a wedge member 79 assists this tendency and the mat passes continuously onto the belt 76 with its fiber surface upwardly and is carried by the belt through the chamber 39' to be plated in the manner already indicated. A wedge member 63' serves to remove the metallized mat from the belt and the mat is suitably wound on a reel 67'.

The metallized product attained, utilizing the apparatus of Figure 2, may of course be plastic coated if desired just as described in connection with the apparatus of Figure 1.

Products readily attainable with the apparatus described are shown in Figures 6–9 in enlarged section. Thus there is indicated in Figure 6 a mat 80 having a metal coating 81 on one side only. This metal coating adhered tenaciously to the thin mat and as indicated in the figure the metal coat is itself thinner than the mat. The mat may have a thickness of, for example, in the range of about 0.1 inch to ¾ of an inch, while the metal may have a thickness of between about 0.2 mil to 5 mils, and the thinner products may be readily rolled for they are extremely flexible; rolling of the heavier products may be accomplished the mats compressing slightly where tension is applied during the rolling operation.

It is to be noted particularly that the product is producible in such thickness that the combination of resin, metal and glass mat settle only very slowly in air and are noticeably affected by air currents. The amount of resin applied may be utilized to control the settling tendency of the product in air. Accordingly the product is useful to interfere with the transmission of high frequency radio waves and radar waves, for example, when dispersed in air.

In the structure of Figure 7 the mat is indicated at 80' while the metal is indicated at 81', and the metal in this instance is on both sides of the mat, the structure being very flexible due to the thinness of all of the components.

In Figure 8 there is shown a mat 80" having a coating of metal 81" on one side and a coating of plastic 86' on the other side of the mat. Such coating of plastic is attained either by spraying the unmetallized side or by passing a metallized mat over a coating roller.

Figure 9:
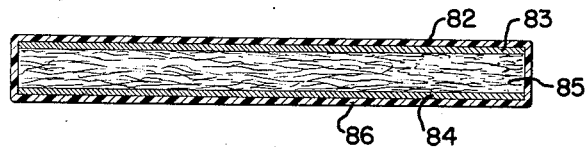

The structure of Figure 9 is attained by taking the structure formed in Figure 2 and passing the mat, metallized on both sides, through a bath, the resin being indicated at 82, the metal at 83, 84, the mat being shown at 85, and the plastic undercoat being shown at 86.

The structure shown in Figure 10 is that of Figure 8 in rolled or spiral form as seen in cross-section. This illustrates the extreme flexibility of the products attainable; these flexible materials are useful as cushionings and springs, in decorative applications, and as condenser parts in electrical equipment where the air trapped within the fibers provides in combination with the fibers a good dielectric value—in such applications the fibers should be of an electrical, non-alkaline glass such as the standard E glass of the industry.

The structure of Figure 11 is a composite of the structures of Figures 6 and 7 which has been resin coated overall as indicated at 86' to an extent sufficient to rigidize the product. This product has some resin entering at the ends into the fibers as at 88 and this tends to result in an overall rigid product; the resin is preferably applied by a combination of dipping and painting to limit the resin pick-up. Such a product has a degree of resiliency between its ends and is useful in cushions; as a building material for it retains nails when driven through two layers of the thin material, the fibers acting to enclose the nail shank.

The structure of Figure 9 when the metal is thinly coated with a transparent polyester as described is a resilient decorative fire-resistant material useful in household furniture applications. The interlaced matted fibers are clearly visible through the resin and the metallic backing when the mat is paper thin reflect light enhancing the decorative effect.

The structure of Figure 7 being an electrically insulating body in which the air assists insulation is also useful in electrical condenser applications as the metal films may be very thin and of wide surface area, the film thickness suitably being as low as 0.1 of a mil.

Products produced in the manner described are strong due to the fact that the metal coats the fibers at the surface initially and then the metal film builds on this initial deposit. The fibers being interlaced to some extent as they form the mat provide a high tear strength while yet providing a high degree of resiliency.

In the usual applications thermo-setting resins are preferred as coatings as most adhere well both to the fibers and the metal but thermo-plastics find utility particularly in applications where the metallized glass is formed to a desired shape prior to resin treatment; in some applications of this nature the heat required for curing would be deleterious to the shaping.

It will be understood that this invention is susceptible to modification in order to adapt it to different usages and conditions and accordingly it is desired to comprehend such modifications within this invention as may fall within the scope of the appended claims.

I claim:

1. In apparatus for producing a glass fiber mat of indeterminate length and having its opposite surface metallized, the combination with a refractory heating furnace for holding molten glass and means for withdrawing filaments of glass therefrom which are attenuated and blown into a mass of fine glass fibers, of a first endless belt arranged to receive and form a movable support for said mass of blown glass fibers and which are directed thereagainst, a gas plating chamber, means for guiding the glass fiber mat-laden belt through said gas plating chamber, conduit means connected with said chamber for introducing a heat-decomposable gaseous metal bearing compound therein, means for heating the outer exposed surface portion of said glass fiber mat while supported on said belt and immediately before introducing the thus heated glass fiber mat into and through said gas plating chamber, the heating of the surface portion of said glass fiber mat being high enough to cause thermal decomposition of the heat-decomposable gaseous metal bearing compound upon introduction of said heated glass fiber mat into the gas plating chamber and in contact with the gaseous metal bearing compound, a second endless belt arranged to pass through said gas plating chamber and coacting with said first endless belt, means for stripping the metallized glass fiber mat from said first endless belt which glass fiber mat has been gas plated on one side and transferring the same to said second belt so that the opposite unplated surface portion of the glass fiber mat forms the exposed surface, thereafter heating the thus exposed glass fiber mat portion while supported and immediately before being conveyed by said second belt into the gas plating chamber whereby said mat is gas plated on the exposed surface portion to produce a glass fiber mat having both top and bottom surfaces composed of metallized glass fibers.

2. In apparatus for producing a glass fiber mat of indeterminate length and having its opposite surfaces metallized, the combination with a refractory heating furnace for holding molten glass and means for withdrawing filaments of glass therefrom which are attenuated and blown into a mass of fine glass fibers, of a first endless belt arranged to receive and form a movable support for said mass of blown glass fibers and which are directed thereagainst, a gas plating chamber, means for guiding glass fiber mat-laden belt through said gas plating chamber, conduit means connected with said chamber for introducing a heat-decomposable gaseous metal bearing compound therein, means for heating the outer exposed surface portion of said glass fiber mat while supported on said belt and immediately before introducing the thus heated glass fiber mat into and through said gas plating chamber, the heating of the surface portion of said glass fiber mat being high enough to cause thermal decomposition of the heat-decomposable gaseous metal bearing compound upon introduction of said heated glass fiber mat into the gas plating chamber and in contact with the gaseous metal bearing compound, a second endless belt arranged to pass through said gas plating chamber and coacting with said first endless belt, means for stripping the metallized glass fiber mat from said first endless belt which glass fiber mat has been gas plated on one side and transferring the same to said second belt so that the opposite unplated surface portion of the glass fiber mat forms the exposed surface, thereafter heating the thus exposed glass fiber mat portion while supported and immediately before being conveyed by said second belt into the gas plating chamber whereby said mat is gas plated on the exposed surface portion to produce a glass fiber mat having both top and bottom surfaces composed of metallized glass fibers, and removing the resultant glass fiber mat from said last-mentioned endless belt and rolling the same up on a storage roll.

References Cited in the file of this patent

UNITED STATES PATENTS

| | | |
|---|---|---|
| 2,039,372 | Wickmann | May 5, 1936 |
| 2,304,182 | Lang | Dec. 8, 1942 |
| 2,430,520 | Marboe | Nov. 11, 1947 |
| 2,489,242 | Slayter et al. | Nov. 22, 1949 |
| 2,616,165 | Brennan | Nov. 4, 1952 |
| 2,622,041 | Godley | Dec. 16, 1952 |
| 2,626,294 | Brennan | Jan. 30, 1953 |
| 2,658,848 | Labino | Nov. 10, 1953 |
| 2,692,220 | Labino | Oct. 19, 1954 |
| 2,701,901 | Pawlyk | Feb. 15, 1955 |